United States Patent
Tseng

(10) Patent No.: US 11,802,768 B2
(45) Date of Patent: Oct. 31, 2023

(54) MEMS MULTIAXIAL ANGULAR RATE SENSOR

(71) Applicant: MiraMEMS Sensing Technology Co., Ltd., Suzhou Industrial Park (CN)

(72) Inventor: Li-Tien Tseng, Taoyuan (TW)

(73) Assignee: MIRAMEMS SENSING TECHNOLOGY CO., LTD., Suzhou Industrial Park (CN)

( * ) Notice: Subject to any disclaimer, the term of this patent is extended or adjusted under 35 U.S.C. 154(b) by 80 days.

(21) Appl. No.: 17/667,903

(22) Filed: Feb. 9, 2022

(65) Prior Publication Data

US 2023/0131683 A1  Apr. 27, 2023

(30) Foreign Application Priority Data

Oct. 27, 2021  (CN) .......................... 202111254140.8

(51) Int. Cl.
*G01C 19/5712* (2012.01)

(52) U.S. Cl.
CPC ................................. *G01C 19/5712* (2013.01)

(58) Field of Classification Search
CPC .................................................. G01C 19/5712
See application file for complete search history.

(56) References Cited

U.S. PATENT DOCUMENTS

| | | | | |
|---|---|---|---|---|
| 8,459,110 B2* | 6/2013 | Cazzaniga | ......... | G01C 19/5747 73/504.12 |
| 2002/0189351 A1* | 12/2002 | Reeds | ................ | G01C 19/5712 73/504.04 |
| 2003/0000305 A1* | 1/2003 | Tracy | ................. | G01C 19/5719 73/504.12 |
| 2004/0004520 A1* | 1/2004 | Giousouf | ................ | H03B 5/30 331/154 |
| 2005/0052092 A1* | 3/2005 | Laermer | ............. | B81C 1/00801 310/311 |
| 2006/0272411 A1* | 12/2006 | Acar | .................. | G01C 19/5712 73/504.04 |
| 2009/0100930 A1* | 4/2009 | Coronato | ................ | G01P 15/14 73/504.12 |

(Continued)

*Primary Examiner* — David J Bolduc
(74) *Attorney, Agent, or Firm* — Muncy. Geissler, Olds & Lowe, P.C.

(57) ABSTRACT

A MEMS multiaxial angular rate sensor includes a substrate and a MEMS wafer layer correspondingly deposited and parallel to each other, and a plurality of anchors coupled to the MEMS wafer layer and fixing the MEMS wafer layer onto the substrate. The MEMS wafer layer includes at least two drive-sensing structures, a third driving ring and two pendulum masses. Each of the drive-sensing structures includes a driving ring, a plurality of driving comb pair structures and a plurality of sensing proof masses respectively coupled to the corresponding driving ring. A third driving ring is coupled to and deposited between the two driving rings of the two drive-sensing structures. In a driving mode, those driving comb pair structures drive the corresponding driving rings to perform periodical rotation motions, and the two driving rings in periodical rotation motions further actuate the third driving ring to perform periodical rotation motion together. Two pendulum masses are respectively coupled to the third driving ring and deposited at opposite two sides of the third driving ring.

21 Claims, 8 Drawing Sheets

(56) References Cited

U.S. PATENT DOCUMENTS

| | | | |
|---|---|---|---|
| 2010/0011857 A1* | 1/2010 | Gier | G01C 19/5712 73/504.12 |
| 2011/0185829 A1* | 8/2011 | Sugita | G01C 19/5712 74/5.7 |
| 2012/0006123 A1* | 1/2012 | Walther | G01C 19/5712 73/774 |
| 2013/0192363 A1* | 8/2013 | Loreck | G01C 19/5733 73/504.12 |
| 2014/0060184 A1* | 3/2014 | Walther | G01P 15/14 73/504.03 |
| 2015/0308830 A1* | 10/2015 | Su | G01C 19/5712 73/504.04 |
| 2016/0265916 A1* | 9/2016 | Kergueris | G01C 19/5621 |
| 2018/0292211 A1* | 10/2018 | Besson | G01C 19/5769 |
| 2020/0263989 A1* | 8/2020 | Blomqvist | G01C 19/574 |
| 2021/0381831 A1* | 12/2021 | Gando | G01C 19/5776 |
| 2022/0282972 A1* | 9/2022 | Geisberger | G01C 19/5712 |

\* cited by examiner

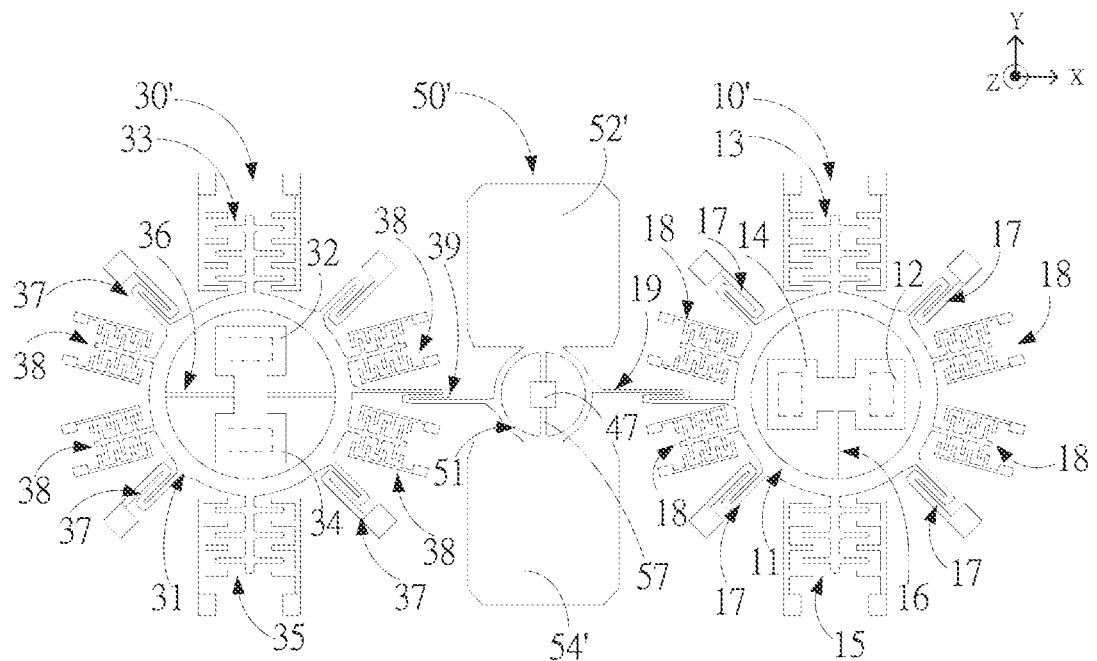

MEMS MULTIAXIAL ANGULAR RATE SENSOR

CROSS-REFERENCE TO RELATED APPLICATIONS

This is an application claims benefit of China Patent Application No. 202111254140.8 filed Oct. 27, 2021, and the disclosure of which is hereby incorporated by references.

1. FIELD OF THE INVENTION

The present invention relates to a MEMS technology for detecting angular rate, particularly to a MEMS multiaxial angular rate sensor.

2. DESCRIPTION OF THE PRIOR ART

A micro electro mechanical system (MEMS) is referred to an electromechanical system having a mechanical function and able detect minor change of a physical property fast and accurately. For example, a MEMS angular rate sensor may be used to detect minor angular displacement. In the six degrees of freedom of motion, the rotations around three orthogonal axes may be measured by a device, i.e. the so-called angular rate sensor. The MEMS angular rate sensor measures angular rate according to the Coriolis Effect. If a mass moves along a direction and is applied to rotational angular speed in an axial direction different from moving direction, the mass will experience a force in the direction that is orthogonal to both the moving direction and the rotating axial direction because of the Coriolis Effect. The displacement caused by the Coriolis force may be measured by a capacitive, piezoelectric, or piezoresistive sensing structure. In the MEMS angular rate sensor, mechanical vibration is used as the primary motion. While a vibrational angular rate sensor experiences an angular motion that is vertical to the direction of the primary motion, a secondary vibration (called the detection motion also) is generated in a third direction vertical to the primary motion and the angular motion. The amplitude of the detection motion may be used to measure the angular rate.

The conventional MEMS three-axis angular rate sensor includes three independent uniaxial angular rate sensors which are respectively an X-axis angular rate sensor, a Y-axis angular rate sensor and a Z-axis angular rate sensor. Thus, the corresponding ASIC needs to have three independent driving circuits. Consequently, the MEMS three-axis angular rate sensor has a larger volume. In order to solve the problem of bulkiness, a design of sharing a mass was developed. However, interference of motion in the design of sharing a mass causes crosstalk interference among the axes of the MEMS three-axis angular rate sensor. Therefore, the manufacturers are still eager to develop a MEMS three-axis angular rate sensor having smaller volume and better sensing quality.

SUMMARY OF THE INVENTION

A MEMS multiaxial angular rate sensor is provided herein, which has independent driving structures and masses in at least two axes thereof, wherein a third driving structure is interactively actuated by the two driving structures to synchronize the motions, whereby to decrease timing asynchronicity and reduce amplitude difference in the oscillations of two driving structures for two axes.

A MEMS multiaxial angular rate sensor is provided herein, which has independent driving structures and masses in at least two axes thereof, wherein the interactive-actuation design of the pendulum masses of the third driving structure is used to synchronize the motions thereof and store the oscillation energy of the proof mass, and wherein a coupling structure is connected with the structure for stabilizing the structure and reducing the oscillation in the unnecessary directions, whereby the motions on the pendulum masses induced by Coriolis force tend to be synchronous anti-phase motions.

A MEMS multiaxial angular rate sensor includes a substrate, a MEMS wafer layer arranged corresponding to and parallel to the substrate, and a plurality of anchors connected with the MEMS wafer layer and fixing the MEMS wafer layer to the substrate. The MEMS wafer layer includes a first driving and sensing structure including a first driving ring, a plurality of first driving comb pair structures and a plurality of first sensing proof masses, wherein the plurality of first driving comb pair structures and the plurality of first sensing proof masses are respectively connected with the first driving ring; a second driving and sensing structure including a second driving ring, a plurality of second driving comb pair structures and a plurality of second sensing proof masses, wherein the plurality of second driving comb pair structures and the plurality of second sensing proof masses are respectively connected with the second driving ring; a third driving ring arranged between and connected with the first driving ring and the second driving ring, wherein in a driving mode, the first driving comb pair structure drives the first driving ring to perform periodical rotation motion, and the second driving comb pair structure drives the second driving ring to perform periodical rotation motion, and the first driving ring and the second driving ring actuate the third driving ring to perform periodical rotation motion; and two pendulum masses respectively connected with the third driving ring and arranged at two opposite external sides of the third driving ring.

A MEMS multiaxial angular rate sensor includes a substrate including a plurality of first sensing pads and a plurality of second sensing pads, wherein the substrate is parallel to a plane defined by a first axis and a second axis; a first driving and sensing structure arranged on the substrate and including a first driving ring connected with a plurality of first driving comb pair structures and two first sensing proof masses, wherein the first sensing proof masses are respectively corresponding to the first sensing pads to form a first differential capacitor pair for detecting the Coriolis force in the direction of a third axis, and wherein the first sensing proof masses are arranged symmetrically with respect to the second axis, and wherein the third axis is vertical to the first axis and the second axis; a second driving and sensing structure arranged on the substrate and including a second driving ring connected with a plurality of second driving comb pair structures and two second sensing proof masses, wherein the second sensing proof masses are respectively corresponding to the second sensing pads to form a second differential capacitor pair for detecting the Coriolis force in the direction of the third axis, and wherein the second sensing proof masses are arranged symmetrically with respect to the first axis; a third driving ring arranged between and connected with the first driving ring and the second driving ring, wherein in a driving mode, the first driving comb pair structure drives the first driving ring to perform periodical rotation motion, and the second driving comb pair structure drives the second driving ring to perform periodical rotation motion, and the first driving ring and the second driving ring actuate the third driving ring to perform periodical rotation motion, and wherein in a sensing mode, the first driving and sensing structure functions as the sensing structure of the first axis, and the second driving and sensing structure functions as the sensing structure of the second axis; two pendulum masses respectively connected with the third driving ring and arranged at two opposite external sides of the third driving ring; and a first coupling structure arranged in the perimeter of the first driving and sensing structure, the second driving and sensing structure and two pendulum masses, wherein each pendulum mass is connected with the third driving ring and the first coupling structure.

Thus, a MEMS multiaxial angular rate sensor comprises a substrate, a MEMS wafer layer arranged corresponding to and parallel to the substrate, and a plurality of anchors connected with the MEMS wafer layer and fixing the MEMS wafer layer to the substrate. The MEMS wafer layer includes at least two driving and sensing structures, a third driving ring and two pendulum masses. Each driving and sensing structure includes a driving ring, a plurality of driving comb pair structures, and a plurality of sensing proof masses. The driving comb pair structures and the sensing proof masses are respectively connected with the corresponding driving rings. The third driving ring is arranged between and connected with the two driving rings. In a driving mode, the driving comb pair structures respectively drive the corresponding driving rings to perform periodical rotation motions, and the two driving rings further actuate the third driving ring to perform periodical rotation motion. The two pendulum masses are respectively connected with the third driving ring and arranged at two opposite external sides of the third driving ring.

BRIEF DESCRIPTION OF THE DRAWINGS

FIG. 1 is a front view schematically showing a MEMS multiaxial angular rate sensor of a first two-axis type embodiment of the present invention.

FIG. 2 is a front view schematically showing a first driving and sensing structure of a MEMS multiaxial angular rate sensor of a first two-axis type embodiment of the present invention.

DESCRIPTION OF THE PREFERRED EMBODIMENT

Figure 3:
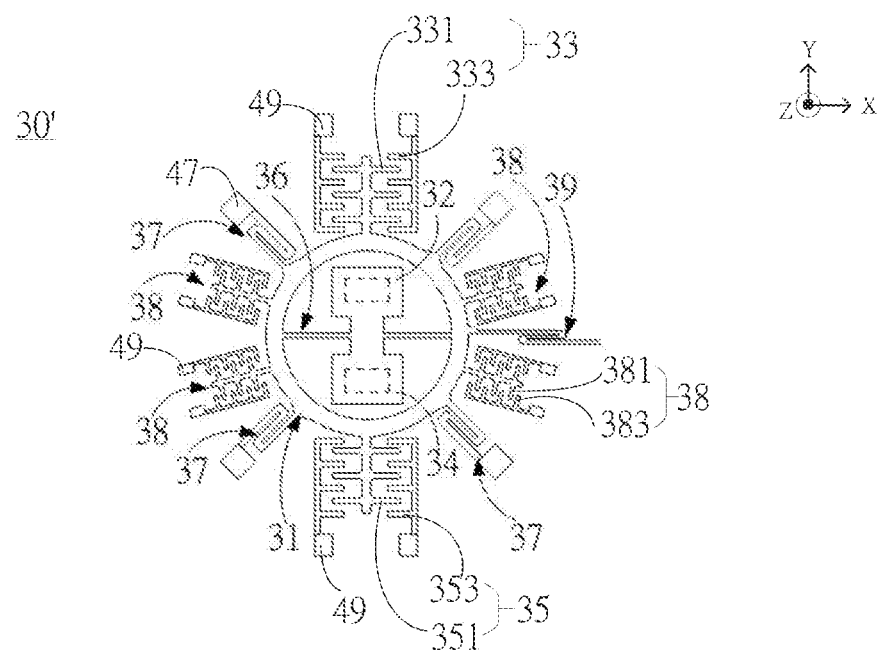
FIG. 3 is a front view schematically showing a second driving and sensing structure of a MEMS multiaxial angular rate sensor of a first two-axis type embodiment of the present invention.

Below, embodiments will be described to demonstrate the present invention. Although each embodiment may involve one or more characteristics, it neither implies that other embodiments must incorporate these characteristics nor implies that these characteristics can only be applied to one embodiment. The characteristics selected from different embodiments may be assembled to provide another embodiment. Thereinafter, the implementation devices and the related elements will be described to illustrate the characteristics of the present invention. However, the elements well known by the persons skilled in that art may not be specifically described in the specification.

FIG. 1 is a front view schematically showing a MEMS multiaxial angular rate sensor of a first two-axis type embodiment of the present invention. Referring to FIG. 1, the MEMS wafer layer includes a first driving and sensing structure 10', a second driving and sensing structure 30' and a third driving structure 50'. In this embodiment, the driving and sensing structures may include sensing proof masses (PM), sensing spring structures, driving rings, driving springs, driving comb pair structures, drive-sensing comb pair structures, and connecting springs. It is noted that the driving proof mass (not labeled in a number in the drawing) includes all the masses driven to move, which may be but not limited to be the driving rings, sensing proof masses, all movable comb structures, actuating structures and driving structures. The first driving and sensing structure 10' includes a first sensing proof mass 12, a first sensing proof mass 14, a first driving ring 11, a first driving comb pair structure 13, a first driving comb pair structure 15, a first sensing spring structure 16, first driving springs 17, first drive-sensing comb pair structures 18, and a first connecting spring 19. The second driving and sensing structure 30' includes a second sensing proof mass 32, a second sensing proof mass 34, a second driving ring 31, a second driving comb pair structure 33, a second driving comb pair structure 35, a second sensing spring structure 36, second driving springs 37, second drive-sensing comb pair structures 38, and a second connecting spring 39. The third driving structure 50' at least includes a third driving ring 51, a third pendulum mass 52' and a third pendulum mass 54'. The first driving ring 11, the second driving ring 31 and the third driving ring 51 are in a linking-up relationship and lied in a straight line. In other words, the geometric centers of the three rings are on the same straight line.

FIG. 2 is a front view schematically showing a first driving and sensing structure of a MEMS multiaxial angular rate sensor of a first two-axis type embodiment of the present invention. Refer to FIG. 1 and FIG. 2. The first sensing proof mass 12 and the first sensing proof mass 14 are arranged inside the first driving ring 11 and connected with the first driving ring 11 via the first sensing spring structure 16. Sensing pads (delineated by the dashed lines) are arranged on the complementary-metal-oxide-semiconductor (CMOS) substrate (not shown in the drawing) below the first sensing proof mass 12 and the first sensing proof mass 14 and corresponding to the first sensing proof mass 12 and the first sensing proof mass 14. The first sensing proof mass 12 and the first sensing proof mass 14 have the same shape and size and are mirror-symmetric to each other. The first sensing spring structure 16 is substantially parallel to the Y axis and arranged on the mirror-symmetric axis of the first sensing proof mass 12 and the first sensing proof mass 14. The first driving ring 11 is connected with the third driving structure 50' via the first connecting spring 19. The first driving ring 11 is connected with a plurality of first anchors 47 via four first driving springs 17, whereby the first driving ring 11 is fixed to a CMOS substrate (not shown in the drawing) and electrically connected with the circuit of the CMOS substrate, wherein the CMOS substrate is arranged below and parallel to the corresponding MEMS wafer layer. Each of the driving comb pair structure and the drive-sensing comb pair structure includes a plurality of movable electrode plates and a plurality of stator electrode plates corresponding to the movable electrode plates. The movable electrode plates and the stator electrode plates are respectively arranged to form comb-like structures. In the driving comb pair structure, two fixed comb structures are symmetrically arranged with respect to two movable comb structures, whereby different-phase voltages may be applied to achieve an oscillation driving effect. The first driving comb pair structure 13 includes a plurality of movable electrode plates 131 and a plurality of stator electrode plates 133, wherein the movable electrode plates 131 and the stator electrode plates 133 are arranged oppositely and alternately. The movable electrode plates 131 are connected with the first driving ring 11, and the stator electrode plates 133 are connected with second anchors 49 and electrically connected with the driving circuit of the underneath CMOS substrate (not shown in the drawing). The first driving comb pair structure 15 includes a plurality of movable electrode plates 151 and a plurality of stator electrode plates 153, wherein the movable electrode plates 151 and the stator electrode plates 153 are arranged oppositely and alternately. The movable electrode plates 151 are connected with the first driving ring 11, and the stator electrode plates 153 are connected with the second anchors 49 and electrically connected with the driving circuit of the underneath CMOS substrate (not shown in the drawing). Each of the first drive-sensing comb pair structures 18 includes a plurality of movable electrode plates 181 and a plurality of stator electrode plates 183, wherein the movable electrode plates 181 and the stator electrode plates 183 are arranged oppositely and alternately. The movable electrode plates 181 are connected with the first driving ring 11, and the stator electrode plates 183 are connected with the second anchors 49. In this embodiment, the first driving comb pair structure 13 and the first driving comb pair structure 15 are respectively arranged on the upper and lower sides of the X axis correspondingly. However, the present invention is not limited to have only a couple of the driving comb pair structures but allowed to have several couples of the driving comb pair structures (not shown in the drawing). The four first drive-sensing comb pair structures 18 are symmetrically arranged on the X axis and the Y axis in pairs. The first sensing proof mass 12 and the first sensing proof mass 14 have the same size and shape and are respectively arranged on two sides of the Y axis.

FIG. 3 is a front view schematically showing a second driving and sensing structure of a MEMS multiaxial angular rate sensor of a first two-axis type embodiment of the present invention. Refer to FIG. 1 and FIG. 3. The second sensing proof mass 32 and the second sensing proof mass 34 are arranged inside the second driving ring 31 and connected with the second driving ring 31 via the second sensing spring structure 36. Sensing pads (delineated by the dashed lines) are arranged on the CMOS substrate (not shown in the drawing) below the second sensing proof mass 32 and the second sensing proof mass 34 and corresponding to the second sensing proof mass 32 and the second sensing proof mass 34. The second sensing proof mass 32 and the second sensing proof mass 34 have the same shape and size and are mirror-symmetric to each other. The second sensing spring structure 36 is substantially parallel to the X axis and arranged on the symmetric axis of the mirror-symmetric second sensing proof mass 32 and second sensing proof mass 34. The second driving ring 31 is connected with the third driving structure 50' via the second connecting spring 39. The second driving ring 31 is connected with a plurality of first anchors 47 via four second driving springs 37, whereby the second driving ring 31 is fixed to a CMOS substrate (not shown in the drawing) and electrically connected with the circuit of the CMOS substrate, wherein the CMOS substrate is arranged below and parallel to the corresponding MEMS wafer layer. Each of the driving comb pair structure and the drive-sensing comb pair structure includes a plurality of movable electrode plates and a plurality of stator electrode plates corresponding to the movable electrode plates. The movable electrode plates and the stator electrode plates are respectively arranged to form comb-like structures. The second driving comb pair structure 33 includes a plurality of movable electrode plates 331 and a plurality of stator electrode plates 333, wherein the movable electrode plates 331 and the stator electrode plates 333 are arranged oppositely and alternately. The movable electrode plates 331 are connected with second driving ring 31, and the stator electrode plates 333 are connected with the second anchor 49 and electrically connected with the driving circuit of the underneath CMOS substrate (not shown in the drawing). The second driving comb pair structure 35 includes a plurality of movable electrode plates 351 and a plurality of stator electrode plates 353, wherein the movable electrode plates 351 and the stator electrode plates 353 are arranged oppositely and alternately. The movable electrode plates 351 are connected with the second driving ring 31, and the stator electrode plates 353 are connected with second anchors 49 and electrically connected with the driving circuit of the underneath CMOS substrate (not shown in the drawing). Each of the second drive-sensing comb pair structures 38 includes a plurality of movable electrode plates 381 and a plurality of stator electrode plates 383, wherein the movable electrode plates 381 and the stator electrode plates 383 are arranged oppositely and alternately.

The movable electrode plates 381 are connected with the second driving ring 31, and the stator electrode plates 383 are connected with the second anchors 49 and electrically connected with the driving circuit of the underneath CMOS substrate (not shown in the drawing). In this embodiment, the second driving comb pair structure 33 and the second driving comb pair structure 35 are respectively arranged on the upper and lower sides of the X axis correspondingly. However, the present invention is not limited to have only a couple of the driving comb pair structures but allowed to have several couples of the driving comb pair structures (not shown in the drawing). The four second drive-sensing comb pair structures 38 are symmetrically arranged on the X axis and the Y axis in pairs. The second sensing proof mass 32 and the second sensing proof mass 34 have the same size and shape and are respectively arranged on two sides of the X axis.

Refer to FIGS. 1-3. The third driving structure 50' includes a third driving ring 51. The third driving ring 51 is connected with the second driving ring 31 via the second connecting spring 39 and connected with the first driving ring 11 via the first connecting spring 19. The third driving ring 51 is connected with a first anchor 47 via a third driving spring 57, whereby the third driving ring 51 is fixed to the substrate (not shown in the drawing). The third driving spring 57 and the first anchor 47 are arranged inside the third driving ring 51. The first anchor 47 is about at the geometrical center of the third driving ring 51. The third pendulum mass 52' and the third pendulum mass 54' are respectively arranged on two sides of the third driving ring 51 and connected with the third driving ring 51. The third pendulum mass 52' and the third pendulum mass 54' are symmetric to each other with respect to the X axis. In a driving mode, periodical voltage signals having an identical magnitude but opposite phases are respectively applied to the fixed comb structures of the first driving comb pair structures and the second driving comb pair structures to generate periodical static electric force that pulls the movable comb structures to form a rotation torque, such that the first driving ring 11 and the second driving ring 31 which are respectively connected with the first driving comb pair structures and the second driving comb pair structures perform periodical rotation because of the rotation torque. Next, first connecting spring 19 and the second connecting spring 39 actuate the third driving ring 51 to perform periodical rotation in a direction opposite to the direction of the rotations of the first driving ring and the second driving ring. For example, while the first driving ring and the second driving ring perform clockwise rotation (about parallel to the X-Y plane) in the periodical rotation, the third driving ring performs counterclockwise rotation. Further, the periodical rotation of the third driving ring will actuate the third pendulum mass 52' and the third pendulum mass 54' to perform periodical swinging on the X-Y plane, whereby a portion of dynamic energy may be stored in the pendulum structure to achieve an effect of stabilizing oscillation and reduce the difference in amplitude and phase. In the conventional angular rate sensor, difference of amplitude and phase may occur in the motion behaviors of an independent first driving and sensing structure and an independent second driving and sensing structure due to the fabrication process variation. For example, the fabrication process variation must occur in the capacitor pairs, the elastic structures, the sizes of the masses of an independent first comb pair structure and an independent second comb pair structure. Although identical voltage signals are applied to the first comb pair structure and the independent second comb pair structure, difference in the amplitudes and phases will still occur in the oscillation frequencies of the two driving structures. Thus, the succeeding signal processing becomes more difficult. Therefore, in this embodiment, the design of the third driving structure 50' enables the linking-up of the first driving and sensing structure and the second driving and sensing structure, reducing or eliminating the amplitude difference and decreasing timing asynchronicity in the periodical rotations of the first driving and sensing structure and the second driving and sensing structure. Further, the design of the third driving structure 50' has the advantages of storing oscillation energy and stabilizing oscillation.

Figure 4:
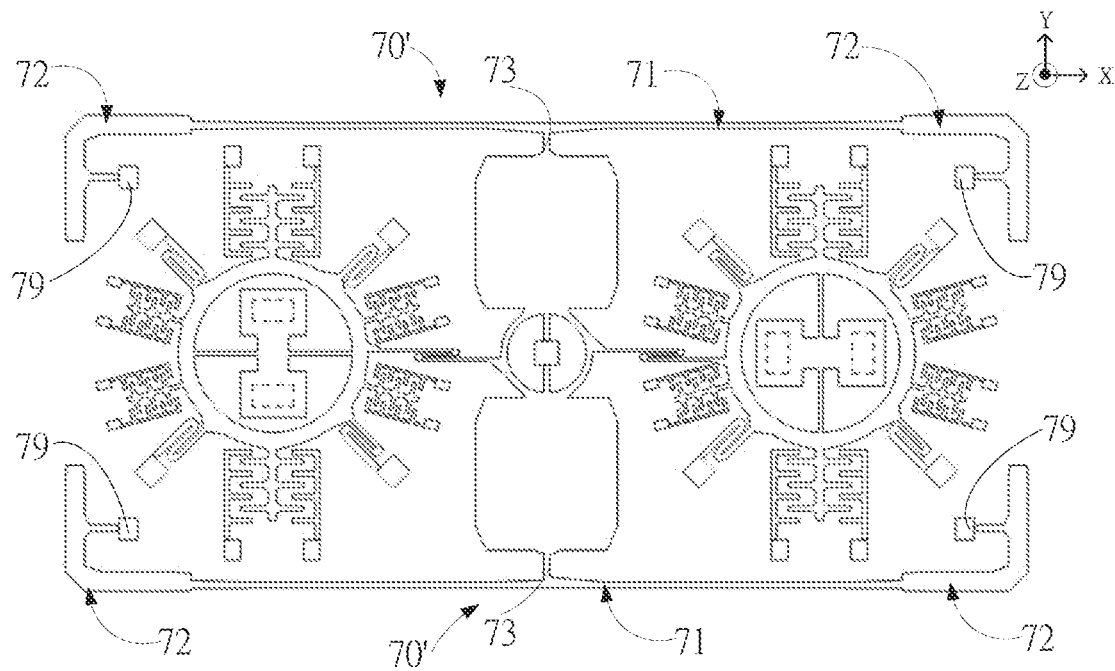
FIG. 4 is a front view schematically showing a MEMS multiaxial angular rate sensor of a second two-axis type embodiment of the present invention.

FIG. 4 is a front view schematically showing a MEMS multiaxial angular rate sensor of a second two-axis type embodiment of the present invention. Refer to FIG. 1 and FIG. 4. In comparison with the first two-axis type embodiment shown in FIG. 1, the second two-axis type embodiment further includes two first coupling structures 70' which are respectively connected with the third pendulum masses 52' and 54'. Each of the first coupling structures 70' includes a connecting spring 71, a connecting spring 73, and two yoke structures 72. In this embodiment, the two first coupling structures 70' are about symmetrically arranged on the upper and lower sides of the X axis and in the perimeter or surrounding of the first driving and sensing structure 10', the second driving and sensing structure 30' and the third driving structure 50'. The connecting spring 71 is about in form of a long strip. Two ends of the connecting spring 71 are respectively connected with the yoke structures 72. The third pendulum masses 52' and 54' are respectively about connected with the middles of the connecting springs 71 via the connecting springs 73. The two connecting springs 73 are symmetrically arranged on two sides of the X axis and respectively connected with the third pendulum mass 52' and the third pendulum mass 54'. Each yoke structure 72 is fixed to the CMOS substrate via a third anchor 79. In the second two-axis type embodiment of the present invention, the first coupling structures 70' are connected with the third pendulum masses. Thereby, the swinging of the third pendulum masses has high elasticity in the X-Y plane and has low elasticity in the Z direction lest a seesaw-type vibration occur and unnecessary motion of the third pendulum masses take place in the Z direction.

Figure 5:
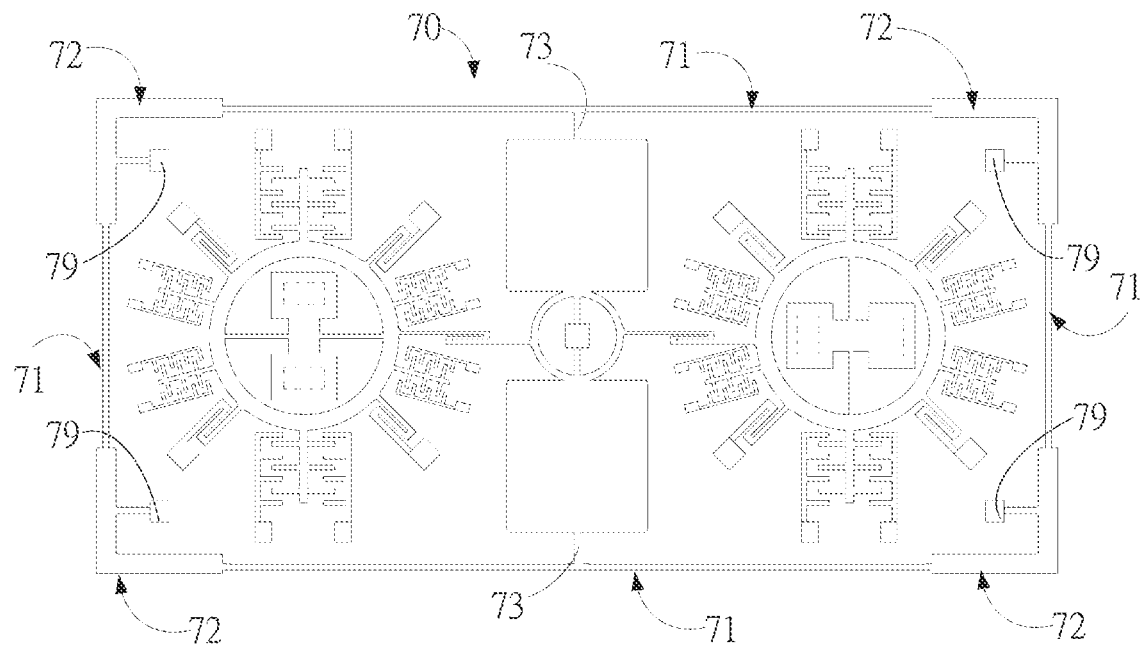
FIG. 5 is a front view schematically showing a MEMS multiaxial angular rate sensor of a third two-axis type embodiment of the present invention.

FIG. 5 is a front view schematically showing a MEMS multiaxial angular rate sensor of a third two-axis type embodiment of the present invention. Refer to FIG. 1, FIG. 4 and FIG. 5. In comparison with the second two-axis type embodiment shown in FIG. 4, the third two-axis type embodiment includes a first coupling structure 70. In the first coupling structure 70, two connecting springs 71 are used to join the upper and lower first coupling structures 70' together, whereby to encircle the first driving and sensing structure 10', the second driving and sensing structure 30' and the third driving structure 50'. In the third two-axis type embodiment of the present invention, the first coupling structure 70 is connected with the third pendulum masses. Thereby, the swinging of the third pendulum mass has high elasticity in the X-Y plane but low elasticity in the Z direction lest a seesaw-type vibration occur and unnecessary motion of the third pendulum masses take place in the Z direction.

Figure 6:
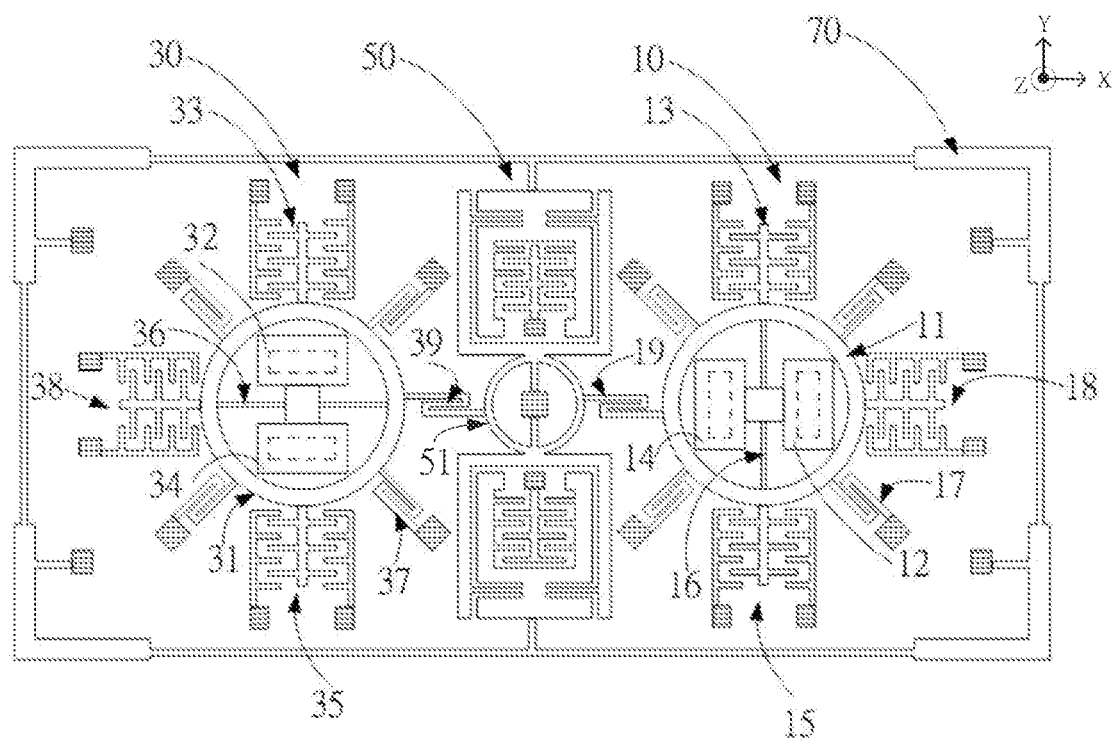
FIG. 6 is a front view schematically showing a MEMS multiaxial angular rate sensor of a first three-axis type embodiment of the present invention.

FIG. 6 is a front view schematically showing a MEMS multiaxial angular rate sensor of a first three-axis type embodiment of the present invention. Refer to FIGS. 1-6. The MEMS wafer layer of the first three-axis type embodiment includes a first driving and sensing structure 10, a second driving and sensing structure 30, a third driving and sensing structure 50 and a first coupling structure 70. In this embodiment, the third driving and sensing structure 50 is different from the third driving structure 50', and the details thereof will be described below. The first driving and sensing structure 10 is similar to the first driving and sensing structure shown 10' in FIG. 1. A first driving ring 11 of the first driving and sensing structure 10 is connected with a third driving ring 51 of the third driving and sensing structure 50 via a first connecting spring 19. The first driving and sensing structure 10 includes a single first drive-sensing comb pair structure 18. In other words, the present invention may have one or more drive-sensing comb pair structures. A second driving ring 31 of the second driving and sensing structure 30 is connected with the third driving ring 51 of the third driving and sensing structure 50 via a second connecting spring 39. Thus an interactively-actuated three-ring driving structure is formed, wherein the first driving ring 11, the second driving ring 31 and the third driving ring 51 are arranged on an identical straight line. In other words, the geometric centers of the three rings are on the same straight line.

Figure 7:
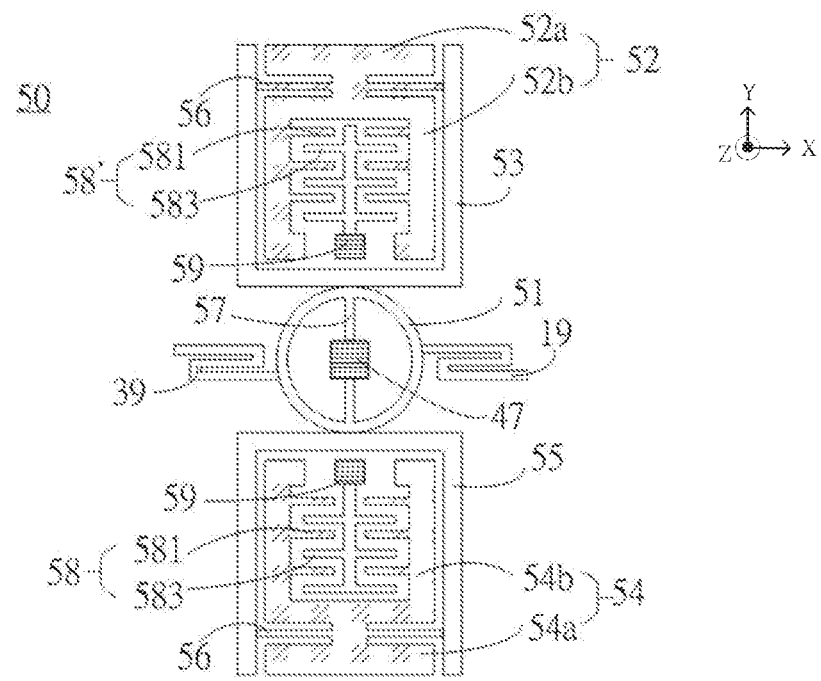
FIG. 7 is a front view schematically showing a third driving and sensing structure of a MEMS multiaxial angular rate sensor of a first three-axis type embodiment of the present invention.

FIG. 7 is a front view schematically showing a third driving and sensing structure of a MEMS multiaxial angular rate sensor of a first three-axis type embodiment of the present invention. Refer to FIGS. 1-7. The third driving and sensing structure 50 includes a third driving ring 51. The third driving ring 51 is connected with the second driving ring 31 via the second connecting spring 39 and connected with the first driving ring 11 via the first connecting spring 19. A third driving frame 53 and a third driving frame 55 are respectively arranged on the upper and lower sides of the third driving ring 51 and connected with the third driving ring 51. A third pendulum mass 52 and a third pendulum mass 54 are respectively arranged inside areas separately encircled by the third driving frame 53 and the third driving frame 55. The third pendulum mass 52 and the third pendulum mass 54 are respectively connected with the third driving frame 53 and the third driving frame 55 via the third sensing spring structures 56. The third pendulum mass 52 includes a first mass 52a and a second mass 52b. The third pendulum mass 54 includes a first mass 54a and a second mass 54b. The third driving and sensing structure 50 further includes a third sensing comb pair structure 58 and a third sensing comb pair structure 58'. The third sensing comb pair structure 58 and the third sensing comb pair structure 58' are respectively arranged inside the areas of the third driving frame 53 and the third driving frame 55 and corresponding to the second mass 52b and the second mass 54b. The third sensing comb pair structure 58' and the third sensing comb pair structure 58 are respectively a Ca capacitor and a Cb capacitor in a pair of differential capacitor in the electric function. Each of the third sensing comb pair structure 58' and the third sensing comb pair structure 58 includes a plurality of movable electrode plates 581 and a plurality of stator electrode plates 583, wherein the movable electrode plates 581 and the stator electrode plates 583 are arranged oppositely and alternately. The movable electrode plates 581 are connected with the corresponding second mass 52b and second mass 54b. The stator electrode plates 583 are connected with second anchors 59 and electrically connected with the sensing circuit of the underneath CMOS substrate (not shown in the drawing). Besides, the spacing between the movable electrode plates 581 and the stator electrode plates 583 of the third sensing comb pair structure 58' and the third sensing comb pair structure 58 which are respectively arranged inside the third driving frame 53 and the third driving frame 55 may be different. Thus, while the upper-side and lower-side proof masses that are respectively within the ranges of the third driving frame 53 and the third driving frame 55 simultaneously move away from or toward the second anchor 59, the capacitances of the two sensing combs vary oppositely to form a differential capacitor pair. In comparison with the two-axis embodiment, the third driving and sensing structure 50 may be regarded as a variant of the third driving structure 50' and using the third pendulum mass 52' and the third pendulum mass 54' to form the third driving frame and the third driving and sensing mass for performing the sensing for the third direction. Further, in this embodiment, the third driving ring 51 performs interactive actuation and driving.

Figure 8:
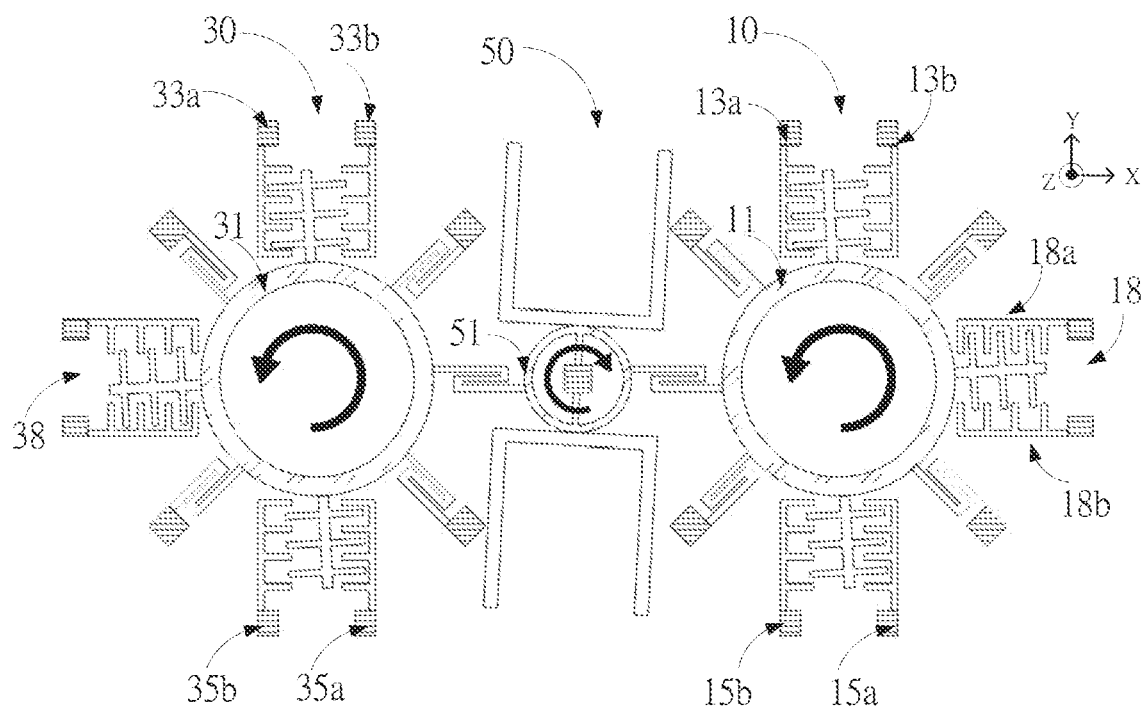
FIG. 8 is a front view schematically showing a portion of the structure of a MEMS multiaxial angular rate sensor of a first three-axis type embodiment of the present invention.

FIG. 8 is a front view schematically showing a portion of the structure of the first three-axis type embodiment of the present invention. Refer to FIG. 6 and FIG. 8. Similar to that described above, while periodical voltage signals of the same magnitude and of opposite phases are respectively applied to two fixed comb structures of the first driving comb pair structure and the second driving comb pair structure, the movable comb structures experience periodical static electric force. Thus, the first driving ring connected with the first driving comb pair structure and the second driving ring connected with the second driving comb pair structure experience rotation torque to make the first driving and the second driving perform periodical rotational vibration. For example, the phase of the driving voltage applied to the combs 13a, 33a, 15a and 35a of the driving comb pair structures is the same; the phase of the driving voltage applied to the combs 13b, 33b, 15b and 35b of the driving comb pair structures is the same; the phase of the driving voltage applied to the comb 13a is different from the phase of the driving voltage applied to the corresponding comb 13b; the two different phases normally have a phase difference of 180 degrees. Besides, the first drive-sensing comb pair structure 18 uses a pair of differential capacitor pairs arranged on two sides thereof to sense the magnitude and frequency of the driving amplitude, whereby to determine whether the driving voltages of the first driving comb pair structure 13 and the first driving comb pair structure 15 are correct. The first drive-sensing comb pair structure 18 uses the capacitance variations of a pair of differential capacitor pairs 18a and 18b arranged on two sides thereof to sense the rotational displacement of the first driving ring 11; the sensing structure transforms the amplitude and frequency of the first driving ring 11 into capacitance signals, whereby to determine the vibration condition is matched or not and then to modify the driving voltage and frequency to make a feedback control process. The second drive-sensing comb pair structure 38 determines whether the driving voltages of the second driving comb pair structure 33 and the second driving comb pair structure 35 are correct. Furthermore, that the first drive-sensing comb pair structure 18 and the second drive-sensing comb pair structure 38 may acquire consistent signal variations because these three driving rings actuate together with each other. And therefore it can be used to sense the vibration behavior such as amplitudes and frequencies of the whole driving rings. For example, while the drive-sensing comb pair structure detects insufficient capacitance change, the driving voltage is raised to increase the torque applied to the driving ring and thus increase the amplitude. While the drive-sensing comb pair structure detects that the frequency change of the capacitor is lower, the frequency of the driving voltage is raised to increase the frequency of the torque applied to the driving ring and thus increase the vibrational frequency. Actuated by the first connecting spring and the third connecting spring, the third driving ring 51 also simultaneously performs rotational oscillation, wherein the direction of the rotational oscillation of the third driving ring 51 is opposite to the direction of the rotational oscillations of the first driving ring 11 and the second driving ring 31. As shown in FIG. 8, while first driving ring 11 and the second driving ring 31 perform counterclockwise rotational oscillations (indicated by black arrows), the third driving ring 51 performs a clockwise rotational oscillation (indicated by another black arrow). Further, the rotational oscillation of the third driving ring actuates the third driving frame 53 and the third driving frame 55 to perform rotational oscillations also. In a preferred embodiment, the size of the third driving ring is relatively smaller than the sizes of the first driving ring and the second driving ring; the third driving ring is arranged in a position at the middle of the first driving ring and the second driving ring and symmetric to the first driving ring and the second driving ring. In such a situation, the oscillation amplitude of the third driving ring increases in the ratio of the radius of the big ring to the radius of the small ring, such that the sensitivity of the third sensing structure increases, the area of the chip reduces and the performance of the sensor enhances. It is noted that: the drive-sensing function of the present invention is completed by the cooperation of the differential capacitor pair of the first drive-sensing comb pair structure 18 and the differential capacitor pair of the second drive-sensing comb pair structure 38. As the three driving rings of the present invention are interactively linked-up, only one set of driving frequency and amplitude needs to be detected. Therefore, while the first driving 11, the second driving ring 31 and the third driving ring 51 perform motions together, the first drive-sensing comb pair structure 18 and the second drive-sensing comb pair structure 38 detect the overall amplitude and frequency of the three driving rings.

Figure 9:
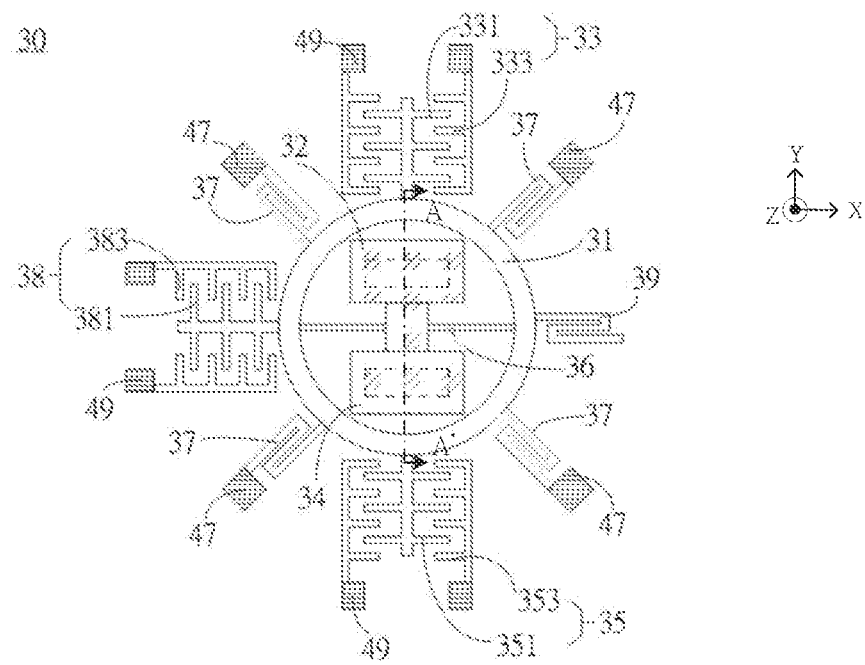
FIG. 9 is a front view schematically showing a second driving and sensing structure of a MEMS multiaxial angular rate sensor of a first three-axis type embodiment of the present invention.
Figure 10:
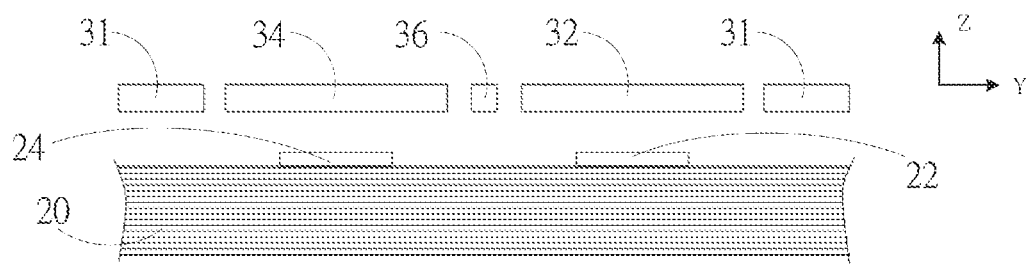
FIG. 10 is a sectional view taken along Line AA' in FIG. 9 for showing a second driving and sensing structure.
Figure 11:
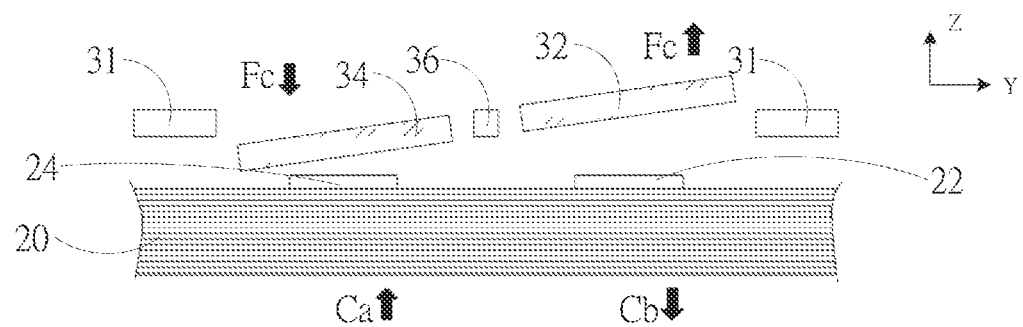
FIG. 11 is another sectional view taken along Line AA' in FIG. 9 for showing a second driving and sensing structure.

FIG. 9 is a front view schematically showing a second driving and sensing structure of a MEMS multiaxial angular rate sensor of a first three-axis type embodiment of the present invention. FIG. 10 and FIG. 11 are sectional views taken along Line AA' in FIG. 9. FIG. 10 shows the structure having not experienced the Coriolis force yet. FIG. 11 shows the structure being experiencing the Coriolis force along the Z direction. Refer to FIG. 6 and FIGS. 8-11. In a sensing mode, the second driving and sensing structure 30 functions as a Y-axis sensing structure; a second sensing pad 22 and a second sensing pad 24 are arranged on the substrate 20 (CMOS substrate) which is under the second sensing proof mass 32 and second sensing proof mass 34 and respectively corresponding to the second sensing proof mass 32 and second sensing proof mass 34. The substrate 20 is arranged parallel to the X-Y plane and opposite to the driving and sensing structures (the MEMS layer). While the MEMS three-axis angular rate sensor performs driving oscillation shown in FIG. 8 and the overall MEMS three-axis angular rate sensor is rotated around the Y axis, a Coriolis force Fc is generated in the Z direction to make the second sensing proof mass 32 and the second sensing proof mass 34 move up and down in the Z direction. The up-and-down movements of the second sensing proof mass 32 and the second sensing proof mass 34 will vary the capacitance between the second sensing proof mass 32 and the corresponding second sensing pad 22 and vary the capacitance between the second sensing proof mass 34 and the corresponding second sensing pad 24, whereby a differential capacitor pair (a second differential capacitor pair) is formed. For example, as shown in FIG. 11, while the second sensing proof mass 32 is moved upward by the Coriolis force Fc to go away from the second sensing pad 22, the capacitance of the capacitor Cb decreases. Meanwhile, the second sensing proof mass 34 is moved downward by the Coriolis force Fc to go toward the second sensing pad 24, and the capacitance of the capacitor Ca increases. The magnitude of the Coriolis force Fc may be measured via measuring the capacitance change of the differential capacitor pair formed by the capacitor Ca and the capacitor Cb. It is noted that: if the MEMS three-axis angular rate sensor is driven to oscillate only without experiencing the overall rotation thereof, the second sensing proof mass 32 and the second sensing proof mass 34 do not experience the Coriolis force Fc but only perform motion together with the second driving ring 31. In such a situation, the second sensing proof mass 32 and second sensing proof mass 34 can only perform periodical rotational oscillation on the plane where the second driving ring 31 performs motion (the X-Y plane). In such a case, the capacitance of the electrode plates which are arranged below the second sensing proof mass 32 and the second sensing proof mass 34 does not vary.

Figure 12:
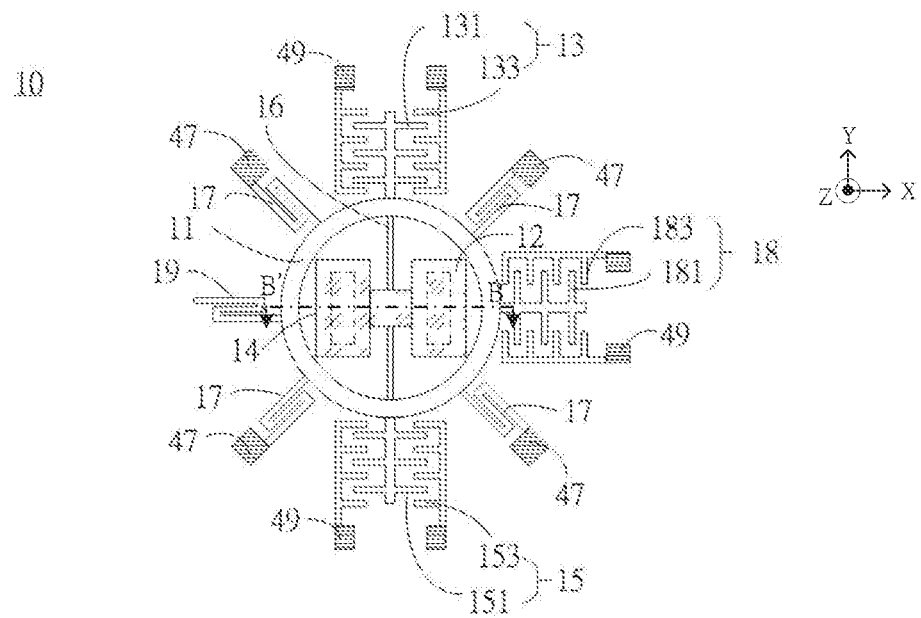
FIG. 12 is a front view schematically showing a first driving and sensing structure of a MEMS multiaxial angular rate sensor of a first three-axis type embodiment of the present invention.
Figure 13:
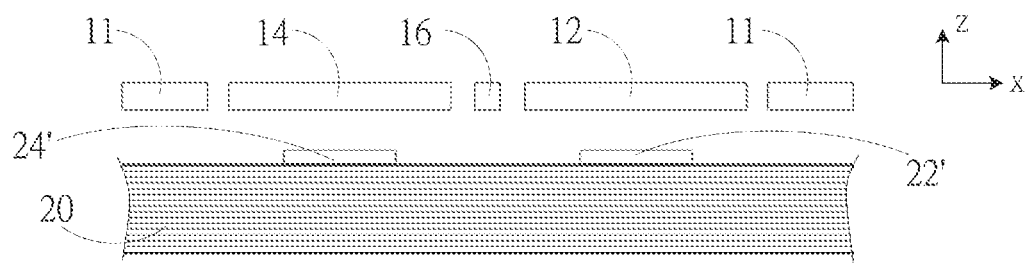
FIG. 13 is a sectional view taken along Line BB' in FIG. 12 for showing a first driving and sensing structure.
Figure 14:
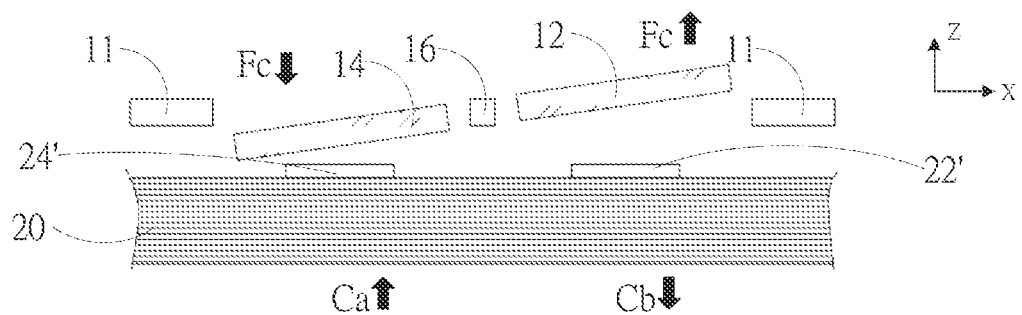
FIG. 14 is another sectional view taken along Line BB' in FIG. 12 for showing a first driving and sensing structure.

FIG. 12 is a front view schematically showing a first driving and sensing structure of a MEMS multiaxial angular rate sensor of a first three-axis type embodiment of the present invention. FIG. 13 and FIG. 14 are sectional views taken along Line BB' in FIG. 12. FIG. 13 shows the structure having not experienced the Coriolis force yet. FIG. 14 shows the structure being experiencing the Coriolis force along the Z direction. Refer to FIG. 6, FIG. 8 and FIGS. 12-14. In a sensing mode, the first driving and sensing structure 10 functions as an X-axis sensing structure; a first sensing pad 22' and a first sensing pad 24' are arranged on the substrate which is under the first sensing proof mass 12 and first sensing proof mass 14 and respectively corresponding to the first sensing proof mass 12 and first sensing proof mass 14. While the MEMS three-axis angular rate sensor performs driving oscillation shown in FIG. 8 and the overall MEMS three-axis angular rate sensor rotates around the X axis (in a sensing mode), a Coriolis force Fc is generated in the Z direction to make the first sensing proof mass 12 and the first sensing proof mass 14 move up and down in the Z direction. The up-and-down movements of the first sensing proof mass 12 and the first sensing proof mass 14 will vary the capacitance between the first sensing proof mass 12 and the corresponding second sensing pad 22' and vary the capacitance between the first sensing proof mass 14 and the corresponding second sensing pad 24', whereby a differential capacitor pair (a first differential capacitor pair) is formed. Therefore, the first driving and sensing structure 10 may function as an X-axis sensing structure. For example, as shown in FIG. 14, while the first sensing proof mass 12 is moved upward by the Coriolis force Fc to go away from the first sensing pad 22', the capacitance of the capacitor Cb decreases. Meanwhile, the first sensing proof mass 14 is moved downward by the Coriolis force Fc to go toward the first sensing pad 24', and the capacitance of the capacitor Ca increases. The magnitude of the Coriolis force Fc may be measured via measuring the capacitance change of the differential capacitor pair formed by the capacitor Ca and the capacitor Cb. It is noted that: if the MEMS three-axis angular rate sensor is driven to oscillate only without experiencing the overall rotation thereof, the first sensing proof mass 12 and the first sensing proof mass 14 do not experience the Coriolis force Fc but can only perform motion together with the first driving ring 11. In such a situation, the first sensing proof mass 12 and the first sensing proof mass 14 can only perform periodical rotational oscillation on the plane where the first driving ring 11 performs motion (the X-Y plane). In such a case, the capacitance of the electrode plates which are arranged below the first sensing proof mass 12 and the first sensing proof mass 14 does not vary.

Figure 15:
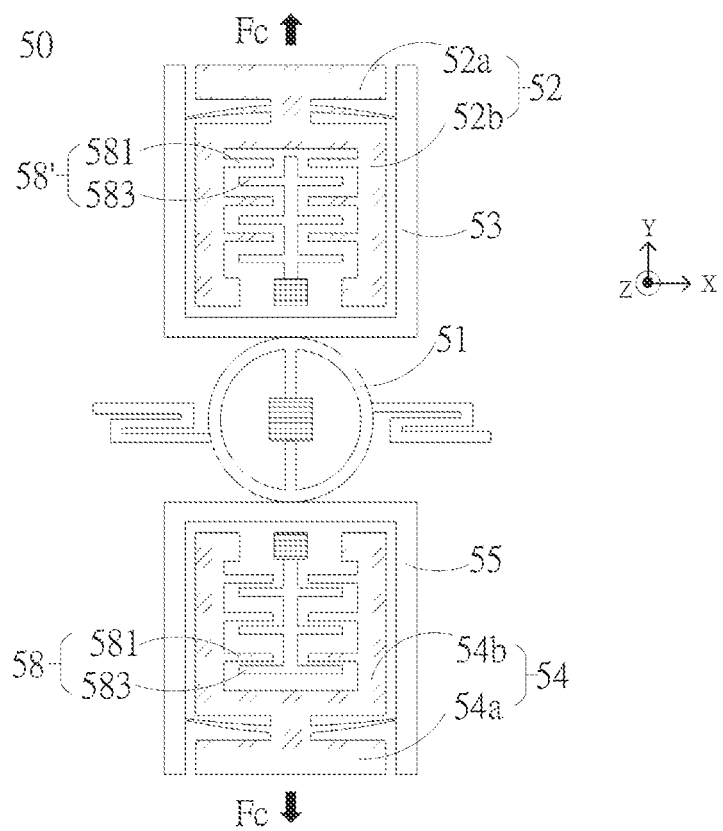
FIG. 15 is a front view schematically showing a third drive-sensing structure of a first three-axis type embodiment of the present invention, which is actuated to perform motion by the Coriolis force.
Figure 16:
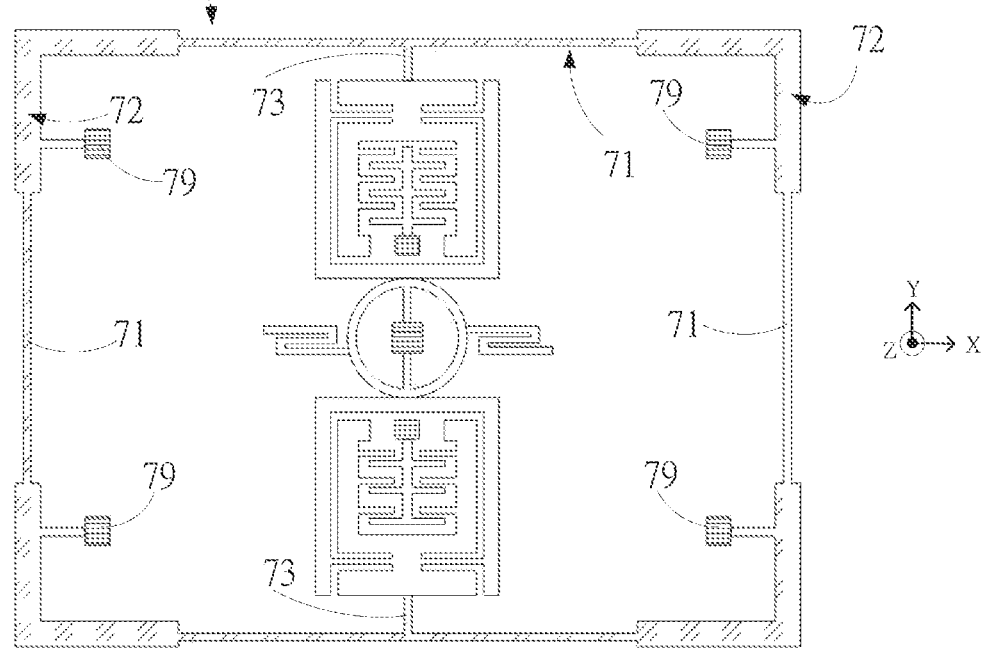
FIG. 16 is a front view schematically showing a portion of the structure of a MEMS multiaxial angular rate sensor of a first three-axis type embodiment of the present invention.

FIG. 15 is a front view schematically showing a third driving and sensing structure of the first three-axis type embodiment of the present invention, which is actuated to perform motion by the Coriolis force. FIG. 16 only shows the third driving and sensing structure and the first coupling structure 70 of the first three-axis type embodiment of the present invention. Refer to FIGS. 6-8, FIG. 15 and FIG. 16. In a sensing mode, third driving and sensing structure 50 is a Z-axis sensing structure. While the interior of the MEMS three-axis angular rate sensor performs driving oscillation shown in FIG. 8 and the overall MEMS three-axis angular rate sensor rotates around the Z axis, a Coriolis force Fc is generated in the Y direction to make the third pendulum mass 52 and the third pendulum mass 54 perform periodical motions along the Y direction on the X-Y plane. The third pendulum mass 52 and the third pendulum mass 54 are connected with the connecting spring 71 of the first coupling structure 70 respectively via the connecting springs 73. The first coupling structure 70, which is in form of an enclosed frame, may enforce and guarantee the third pendulum mass 52 and the third pendulum mass 54 to perform motions simultaneously, separating the resonant frequency of in-phase and the resonant frequency of anti-phase, whereby the structure trends to perform oscillation motion in anti-phase mode. In the case that the first coupling structure 70 does not exist, the resonant frequency of the in-phase motion is very close to the resonant frequency of the anti-phase motion. In such a case, sensing signals may be distorted or failed because the Coriolis force-induced sensing oscillation may be asynchronous or even enters an in-phase motion. In the case that the third pendulum mass 52 and the third pendulum mass 54 perform anti-phase motions (move far away from the first anchor 47 at the center simultaneously) and while the third pendulum mass 52 moves upward (to decrease the capacitance), the third pendulum mass 54 moves downward (to increase the capacitance); while the third pendulum mass 52 moves downward, the third pendulum mass 54 moves upward. Thus, the magnitude of the Coriolis force Fc may be obtained via measuring the capacitance change of the differential capacitor pair which is formed by the third sensing comb pair structure 58' and the third sensing comb pair structure 58. If the oscillations of the third pendulum mass 52 and the third pendulum mass 54 become asynchronous (have phase differences) or even become in-phase, two detection capacitors will receive asynchronous changes of capacitances or even in-phase changes of capacitances. Thus, the capacitance change of the differential capacitor pair is decreased or cancelled. Accordingly, in the design of the first coupling structure 70, the spring constant of the bending deformation in an anti-phase motion is smaller than the spring constant of the twist deformation in an in-phase motion. Therefore, the anti-phase resonant frequencies and the in-phase resonant frequencies of the third pendulum mass 52 and the third pendulum mass 54 may be separated by the design of the first coupling structure 70.

Figure 17:
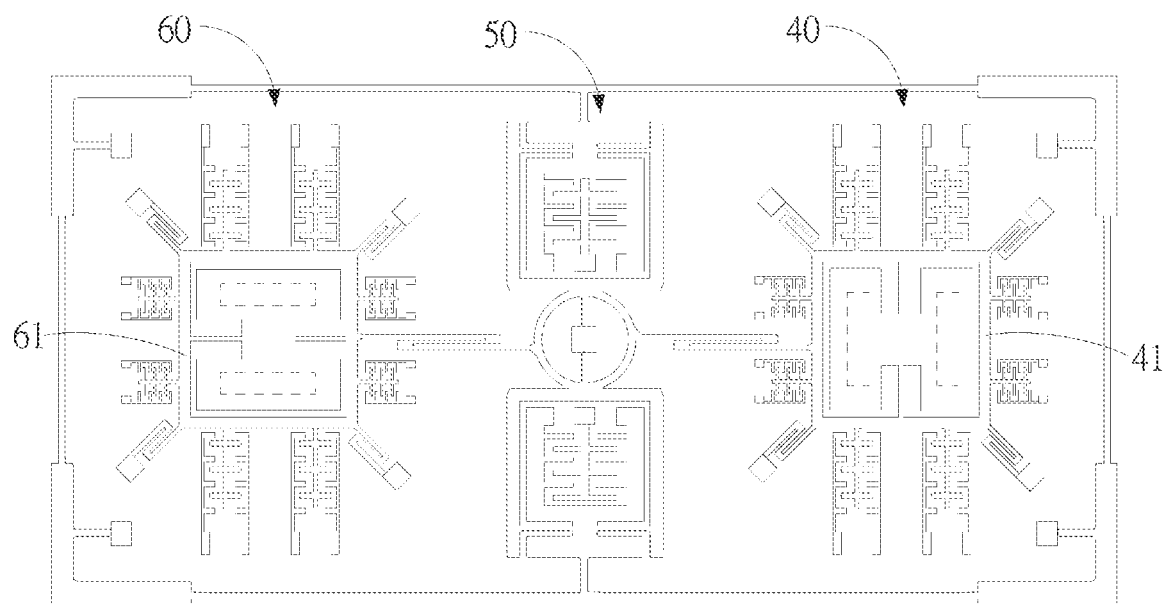
FIG. 17 is a front view schematically showing a MEMS multiaxial angular rate sensor of a second three-axis type embodiment of the present invention.

FIG. 17 is a front view schematically showing a MEMS multiaxial angular rate sensor of a second three-axis type embodiment of the present invention. Refer to FIG. 6 and FIG. 17. Different from the first three-axis type embodiment in FIG. 6, the first driving ring 41 of the first driving and sensing structure 40 of the MEMS wafer layer of the second three-axis type three-axis angular rate sensor is a rectangular ring, and the second driving ring 61 of the second driving and sensing structure 60 is also a rectangular ring. In the first driving and sensing structure 40 of the embodiment shown in FIG. 17, there are two sets of first driving comb pair structures 13 and two sets of the first driving comb pair structures 15, which are oppositely arranged on two sides of the first driving ring 41, and the two sides are symmetric to each other with respect to the X axis. Similarly, in the second driving and sensing structure 60 of the embodiment shown in FIG. 17, there are two sets of second driving comb pair structures 33 and two sets of the second driving comb pair structures 35 which are oppositely arranged on two sides of the second driving ring 61 and the two sides are symmetric to each other with respect to the X axis. The first driving and sensing structure 40 of the embodiment shown in FIG. 17 further includes four sets of first drive-sensing comb pair structures 18 which are oppositely arranged on another two sides of the first driving ring 41 and the another two sides are symmetric to each other. Similarly, the second driving and sensing structure 60 of the embodiment shown in FIG. 17 further includes four sets of second driving and sensing comb structures 38 which are oppositely arranged on another two sides of the second driving ring 61 and the another two sides are symmetric to each other. The other portions of the second three-axis type three-axis embodiment shown in FIG. 17 are identical or similar to the corresponding portions of the first three-axis type embodiment shown in FIG. 6 and will not repeat herein. Therefore, the present invention may include one or more sets of driving comb pair structures or drive-sensing comb pair structures. In the case of having a plurality of sets of driving comb pair structures or drive-sensing comb pair structures, it is preferred: the driving comb pair structures or the drive-sensing comb pair structures or both are arranged oppositely. The opposite arrangement is in reference to the driving ring and is mainly to make the driving and sensing structure itself of an arbitrary axis have symmetry. It is preferred: the first driving and sensing structure and the second driving and sensing structure have symmetry. However, the present invention does not constrain that the first driving and sensing structure and the second driving and sensing structure are completely identical in structure.

Figure 18:
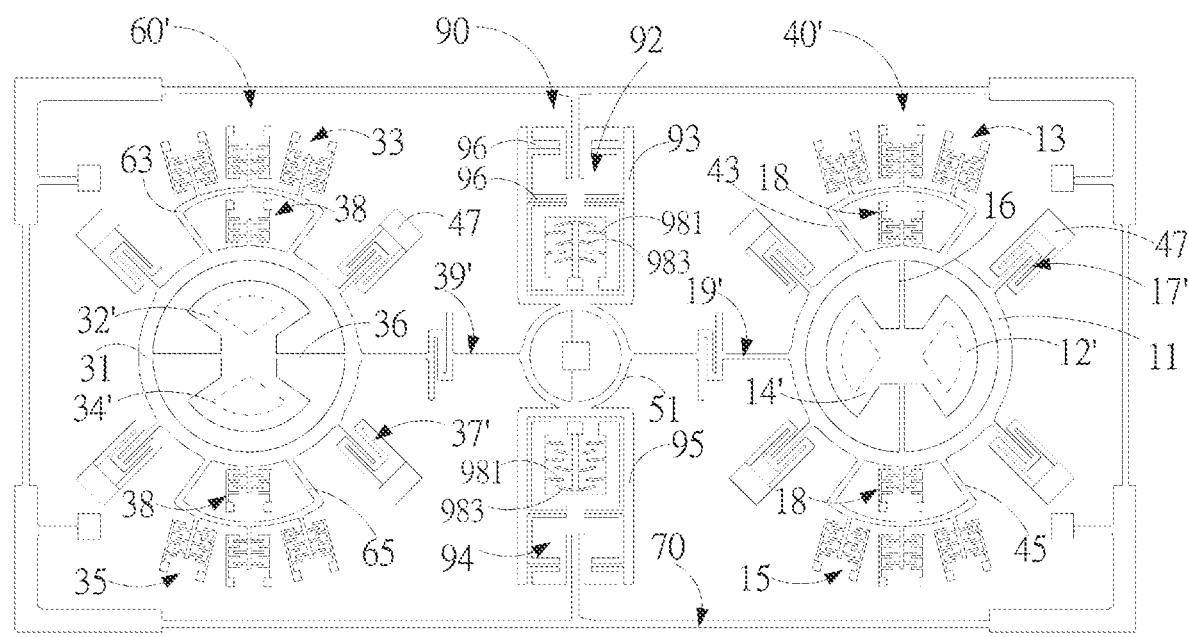
FIG. 18 is a front view schematically showing a MEMS multiaxial angular rate sensor of a third three-axis type embodiment of the present invention.

FIG. 18 is a front view schematically showing a MEMS multiaxial angular rate sensor of a third three-axis type embodiment of the present invention. Refer to FIG. 6 and FIG. 18. The MEMS wafer layer of the third three-axis type embodiment includes a first driving and sensing structure 40', a second driving and sensing structure 60', a third driving and sensing structure 90, and a first coupling structure 70. In this embodiment, a first sensing proof mass 12' and a first sensing proof mass 14' are arranged inside the first driving ring 11 and connected with the first driving ring 11 via a first sensing spring structure 16. The geometrical shape of the first sensing proof mass 12' is different from the geometrical shape of the first sensing proof mass 12 in FIG. 6. The first sensing proof mass 12' is a fan-shape plate. The geometrical shape of the first sensing proof mass 14' is different from the geometrical shape of the first sensing proof mass 14 in FIG. 6. The first sensing proof mass 14' is also a fan-shape plate. The first sensing proof mass 12' and the first sensing proof mass 14' have the same size and shape and are mirror images to each other. The first sensing spring structure 16 is substantially parallel to the Y axis and arranged on the mirror-symmetric axis of the first sensing proof mass 12' and the first sensing proof mass 14'. The first driving ring 11 is connected with a third driving ring 51 of the third driving and sensing structure 90 via a first connecting spring 19'. The first driving ring 11 is connected with first anchors 47 via four first driving springs 17' and thus fixed to the substrate (not shown in the drawing). The geometrical shape of the first connecting spring 19' is different from the geometrical shape of the first connecting spring 19. The geometrical shape of the first driving spring 17' is different from the geometrical shape of the first driving spring 17. A plurality of first driving comb pair structures 13 are arranged at some intervals and connected with the first driving ring 11 via a frame structure 43. One or more first drive-sensing comb pair structures 18 are arranged inside the area encircled by the frame structure 43. A plurality of first driving comb pair structures 15 are arranged at some intervals and connected with the first driving ring 11 via a frame structure 45. One or more first drive-sensing comb pair structures 18 are arranged inside the area encircled by the frame structure 45. The frame structure 43 and the frame structure 45 are symmetrically arranged on the upper and lower sides of the X axis. In this embodiment, the drive-sensing comb pair structure is arranged between the driving ring and the driving comb pair structure.

Refer to FIG. 6 and FIG. 18 again. A second sensing proof mass 32' and a second sensing proof mass 34' are arranged inside the second driving ring 31 and connected with the second driving ring 31 via a second sensing spring structure 36. The geometrical shape of the second sensing proof mass 32' is different from the geometrical shape of the second sensing proof mass 32 in FIG. 6. The geometrical shape of the second sensing proof mass 34' is different from the geometrical shape of the second sensing proof mass 34 in FIG. 6. The second sensing proof mass 32' and the second sensing proof mass 34' have the same size and shape, being mirror images to each other. The second sensing spring structure 36 is substantially parallel to the X axis and arranged in the center of the mirror images of the second sensing proof mass 32' and the second sensing proof mass 34'. The second driving ring 31 is connected with the third driving ring 51 of the third driving and sensing structure 90 via a second connecting spring 39'. The second driving ring 31 is connected with first anchors 47 via four second driving springs 37' and thus fixed to the substrate (not shown in the drawing). The geometrical shape of the second connecting spring 39' is different from the geometrical shape of the second connecting spring 39. The geometrical shape of the second driving spring 37' is different from the geometrical shape of the second driving spring 37. A plurality of second driving comb pair structures 33 are arranged at some intervals and connected with the second driving ring 31 via a frame structure 63. One or more second drive-sensing comb pair structures 38 are arranged inside the area encircled by the frame structure 63. A plurality of second driving comb pair structures 35 are arranged at some intervals and connected with the second driving ring 31 via a frame structure 65. One or more second drive-sensing comb pair structures 38 are arranged inside the area encircled by the frame structure 65. The frame structure 63 and the frame structure 65 are symmetrically arranged on the upper and lower sides of the X axis. In this embodiment, the drive-sensing comb pair structure is arranged between the driving ring and the driving comb pair structure.

Refer to FIG. 6 and FIG. 18 once again. The third driving and sensing structure 90 includes a third driving ring 51. The third driving ring 51 is connected with the second driving ring 31 via the second connecting spring 39' and connected with the first driving ring 11 via the first connecting spring 19'. A third driving frame 93 and a third driving frame 95 are arranged on the upper and lower sides of the third driving ring 51, symmetric to each other with respect to the X axis and connected with the third driving ring 51. A third sensing proof mass 92 and a third sensing proof mass 94 are respectively arranged inside the areas encircle by the third driving frame 93 and the third driving frame 95. The third sensing proof mass 92 and the third sensing proof mass 94 are respectively connected with the third driving frame 93 and the third driving frame 95 via a plurality of third sensing spring structures 96. The third driving and sensing structure 90 further includes two third sensing comb pair structures which are respectively arranged inside the areas encircle by the third driving frame 93 and the third driving frame 95. Each of the third sensing comb pair structures further includes a plurality of movable electrode plates 981 and a plurality of stator electrode plates 983. The movable electrode plates 981 and the stator electrode plates 983 are arranged alternately. The movable electrode plates 981 are connected with the corresponding third sensing proof mass. The stator electrode plates 983 are connected with the second anchor. The movable electrode plates 981 and the stator electrode plates 983 are arc-shaped plates, which are different from the straight plates of the movable electrode plates 581 and the stator electrode plates 583.

The embodiments mentioned above are to demonstrate the technical thoughts and characteristics of the present invention to enable the persons skilled in the art to understand, make, and use the present invention. However, these embodiments are only to exemplify the present invention but not to limit the scope of the present invention. Any equivalent modification or variation according to the spirit of the present invention is to be also included by the scope of the present invention.

NUMERIC DESCRIPTION

10', 10, 40, 40': first driving and sensing structure
11, 41: first driving ring
12, 12', 14, 14': first sensing proof mass
13, 15: first driving comb pair structure
13a, 13b, 15a, 33a, 33b, 35a, 35b
131, 151, 181, 331, 351, 381, 581, 981: movable electrode plate
133, 153, 183, 333, 353, 383, 583, 983: stator electrode plate
16: first sensing spring structure
17, 17': first driving spring
18: first drive-sensing comb pair structure
18a, 18b: differential capacitor pair
19, 19': first connecting spring
20: substrate
22', 24': first sensing pad
22, 24: second sensing pad
30', 30, 60, 60': second driving and sensing structure
31, 61: second driving ring
32, 32', 34, 34': second sensing proof mass
33, 35: second driving comb pair structure
36: second sensing spring structure
37, 37': second driving spring
38: second drive-sensing comb pair structure
39, 39': second connecting spring
43, 45, 63, 65: frame structure
47: first anchor
49, 59: second anchor
50': third driving structure
50, 90: third driving and sensing structure
51: third driving ring
52, 54: third pendulum mass
52', 54': third pendulum mass
52a, 54a: first mass 52*b*, 54*b*: second mass
53, 55, 93, 95: third driving frame
56, 96: third sensing spring structure
57: third driving spring
58, 58': third sensing comb pair structure
70', 70: first coupling structure
71, 73: connecting spring
72: yoke structure
79: third anchor
92, 94: third sensing proof mass
Fc: Coriolis force
Ca, Cb: capacitor
X, Y, Z: axis

What is claimed is:

1. A micro electro mechanical system multiaxial angular rate sensor, comprising a substrate arranged oppositely and parallel to a micro electro mechanical system (MEMS) wafer layer and a plurality of anchors connecting the MEMS wafer layer with the substrate and fixing the MEMS wafer layer to the substrate, and characterized in that the MEMS wafer layer comprises:
   a first driving and sensing structure including a first driving ring, a plurality of first driving comb pair structures and a plurality of first sensing proof masses, wherein the first driving comb pair structures and the first sensing proof masses are respectively connected with the first driving ring;
   a second driving and sensing structure including a second driving ring, a plurality of second driving comb pair structures and a plurality of second sensing proof masses, wherein the second driving comb pair structures and the second sensing proof masses are respectively connected with the second driving ring;
   a third driving ring arranged between the first driving ring and the second driving ring and connected with the first driving ring and the second driving ring, wherein in a driving mode, the first driving comb pair structures drive the first driving ring to perform periodical rotational motions; the second driving comb pair structures drive the second driving ring to perform periodical rotational motions; and the first driving ring and the second driving ring actuate the third driving ring to perform periodical rotational motions; and
   two pendulum masses, respectively connected with the third driving ring and arranged on two opposite sides outside the third driving ring.

2. The micro electro mechanical system multiaxial angular rate sensor according to claim 1, further comprising a first coupling structure arranged on a perimeter of the first driving and sensing structure, the second driving and sensing structure and the two pendulum masses, wherein each of the pendulum masses is connected with the third driving ring and the first coupling structure, and the first coupling structure is connected with and fixed to the substrate via the anchors.

3. The micro electro mechanical system multiaxial angular rate sensor according to claim 2, wherein the first coupling structure includes a plurality of connecting springs and at least two yoke structures; the connecting springs connect each of the pendulum masses and the two yoke structures; and the two yoke structures are connected with and fixed to the substrate via the anchors.

4. The micro electro mechanical system multiaxial angular rate sensor according to claim 1, further comprising a first sensing spring structure and a second sensing spring structure, wherein the first sensing proof masses are arranged inside the first driving ring and connected with the first driving ring via the first sensing spring structure; and the second sensing proof masses are arranged inside the second driving ring and connected with the second driving ring via the second sensing spring structure.

5. The micro electro mechanical system multiaxial angular rate sensor according to claim 4, wherein the second sensing spring structure is parallel to a first axis; the second sensing proof masses are symmetric with respect to the first axis; the first sensing spring structure is parallel to a second axis; the second sensing proof masses are symmetric with respect to the second axis; and the first axis is vertical to the second axis.

6. The micro electro mechanical system multiaxial angular rate sensor according to claim 5, wherein the first driving comb pair structures are symmetric with respect to the first axis and the second axis in pairs; and the second driving comb pair structures are symmetric with respect to the first axis, the second axis or the first axis and the second axis in pairs.

7. The micro electro mechanical system multiaxial angular rate sensor according to claim 1, wherein each of the pendulum masses includes a third driving frame connected with the third driving ring; a third sensing proof mass arranged inside the third driving frame; and a third sensing spring structure connecting the third sensing proof mass with the third driving frame.

8. The micro electro mechanical system multiaxial angular rate sensor according to claim 7, further comprising a third driving spring arranged inside the third driving ring, wherein the third driving spring is connected with the third driving ring and fixed to the substrate via one of the anchors.

9. The micro electro mechanical system multiaxial angular rate sensor according to claim 1, further comprising a first drive-sensing comb pair structure and a second drive-sensing comb pair structure, wherein the first drive-sensing comb pair structure is connected with the first driving ring, and the second drive-sensing comb pair structure is connected with the second driving ring.

10. The micro electro mechanical system multiaxial angular rate sensor according to claim 1, wherein geometric centers of the first driving ring, the second driving ring and the third driving ring fall on an identical straight line; and in the driving mode, directions of the periodical motions of the first driving ring and the second driving ring are different from a direction of the periodical rotational motions of the third driving ring.

11. The micro electro mechanical system multiaxial angular rate sensor according to claim 1, wherein the substrate includes a plurality of first sensing pads and a plurality of second sensing pads; the first sensing pads are respectively corresponding to the first sensing proof masses; and the second sensing pads are respectively corresponding to the second sensing proof masses.

12. A micro electro mechanical system multiaxial angular rate sensor, comprising:
   a substrate comprising a plurality of first sensing pads and a plurality of second sensing pads and being parallel to a plane defined by a first axis and a second axis;
   a first driving and sensing structure arranged on the substrate and comprising a first driving ring connected with a plurality of first driving comb pair structures and two first sensing proof masses, wherein the first sensing proof masses are respectively corresponding to the first sensing pads to form a first differential capacitor pair for detecting a Coriolis force in a direction of a third axis; the first sensing proof masses are symmetrically arranged with respectively to the second axis; and the direction of the third axis is vertical to a direction of the first axis and a direction of the second axis;

a second driving and sensing structure arranged on the substrate and comprising a second driving ring connected with a plurality of second driving comb pair structures and two second sensing proof masses, wherein the second sensing proof masses are respectively corresponding to the second sensing pads to form a second differential capacitor pair for detecting a Coriolis force in the direction of the third-axis; the second sensing proof masses are symmetrically arranged with respectively to the first axis;

a third driving ring arranged between the first driving ring and the second driving ring and connected with the first driving ring and the second driving ring, wherein in a driving mode, the first driving comb pair structures drive the first driving ring to perform periodical rotational motions; the second driving comb pair structures drive the second driving ring to perform periodical rotational motions; the first driving ring and the second driving ring further actuate the third driving ring to perform periodical rotational motions; and in a sensing mode, the first driving and sensing structure functions as a sensing structure of the first axis, and the second driving and sensing structure functions as a sensing structure of the second axis;

two pendulum masses respectively connected with the third driving ring and arranged on opposite sides outside the third driving ring; and a first coupling structure arranged on a perimeter of the first driving and sensing structure, the second driving and sensing structure and two pendulum masses, wherein each of the pendulum masses is connected with the third driving ring and the first coupling structure.

13. The micro electro mechanical system multiaxial angular rate sensor according to claim 12, wherein in the driving mode, directions of the periodical motions of the first driving ring and the second driving ring are different from a direction of the periodical rotational motions of the third driving ring.

14. The micro electro mechanical system multiaxial angular rate sensor according to claim 12, further comprising a plurality of first driving springs, a plurality of second driving springs, a third driving spring and a plurality of anchors, wherein the first driving ring is connected with a portion of the anchors via the first driving springs and fixed to the substrate; the second driving ring is connected with a portion of the anchors via the second driving springs and fixed to the substrate; the third driving spring is arranged inside the third driving ring; and the third driving ring is connected with one of the anchors via the third driving spring and fixed to the substrate.

15. The micro electro mechanical system multiaxial angular rate sensor according to claim 12, wherein each of the pendulum masses comprises a third driving frame connected with the third driving ring; a third sensing proof mass arranged inside the third driving frame; and a third sensing spring structure connecting the third sensing proof masses with the third driving frame; and wherein in a sensing mode, the third sensing proof masses function as a sensing structure of the third axis, and the third axis is respectively vertical to the first axis and the second axis.

16. The micro electro mechanical system multiaxial angular rate sensor according to claim 15, wherein the first driving and sensing structure further comprises a first sensing spring structure connected with the first driving ring and the first sensing proof masses; the first sensing spring structure and the first sensing proof masses are arranged inside the first driving ring; and the first sensing proof masses are symmetrically arranged with respect to the second axis.

17. The micro electro mechanical system multiaxial angular rate sensor according to claim 15, wherein the second driving and sensing structure further comprises a second sensing spring structure connected with the second driving ring and the second sensing proof masses; the second sensing spring structure and the second sensing proof masses are arranged inside the second driving ring; and the second sensing proof masses are symmetrically arranged with respect to the first axis.

18. The micro electro mechanical system multiaxial angular rate sensor according to claim 12, wherein the first driving comb pair structures are symmetric with respect to the first axis and the second axis in pairs; and the second driving comb pair structures are symmetric with respect to the first axis, the second axis or the first axis and the second axis in pairs.

19. The micro electro mechanical system multiaxial angular rate sensor according to claim 15, further comprising a plurality of first drive-sensing comb pair structures and a plurality of second drive-sensing comb pair structures, wherein the first drive-sensing comb pair structures are connected with the first driving ring; and the second drive-sensing comb pair structures are connected with the second driving ring.

20. The micro electro mechanical system multiaxial angular rate sensor according to claim 19, further comprising a plurality of frame structures, wherein at least one of the first or second drive-sensing comb pair structures is arranged inside each of the frame structures; and the frame structures are connected with the first driving ring, the first driving comb pair structures, the second driving ring and the second driving comb pair structures.

21. The micro electro mechanical system multiaxial angular rate sensor according to claim 20, wherein the frame structures are symmetrically arranged with respect to the first axis or the second axis in pairs.

\* \* \* \* \*